(12) United States Patent
Ho et al.

(10) Patent No.: US 10,488,991 B2
(45) Date of Patent: Nov. 26, 2019

(54) TOUCH PANEL COMPRISING A SENSING ELECTRODE LAYER AND TOUCH SENSING DISPLAY USING THE SAME

(71) Applicant: TPK TOUCH SOLUTIONS (XIAMEN) INC., Xiamen (CN)

(72) Inventors: Kwan-Sin Ho, Miaoli (TW); Pingping Huang, Sanming (CN); Junping Yang, Longhai (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 79 days.

(21) Appl. No.: 13/894,430

(22) Filed: May 15, 2013

(65) Prior Publication Data
US 2019/0064954 A1   Feb. 28, 2019

(51) Int. Cl.
*G06F 3/044*  (2006.01)
*G06F 3/041*  (2006.01)

(52) U.S. Cl.
CPC ............ *G06F 3/044* (2013.01); *G06F 3/0416* (2013.01)

(58) Field of Classification Search
CPC ... G06F 3/041–047; G06F 2203/04103; G06F 2203/04107; G06F 2203/04111
See application file for complete search history.

(56) References Cited

U.S. PATENT DOCUMENTS

| | | | |
|---|---|---|---|
| 4,868,550 A | 9/1989 | Sasaki et al. | |
| 8,487,904 B2* | 7/2013 | Mi | G06F 3/044 178/18.06 |
| 9,563,315 B2* | 2/2017 | Bayramoglu | G06F 3/044 |
| 2005/0126831 A1* | 6/2005 | Richter | G06F 3/044 178/18.01 |
| 2011/0234526 A1* | 9/2011 | Mi | H05K 3/30 345/174 |
| 2011/0298750 A1* | 12/2011 | Wang | G06F 3/0412 345/174 |

FOREIGN PATENT DOCUMENTS

| | | |
|---|---|---|
| CN | 1737826 | 2/2006 |
| CN | 101122839 | 2/2008 |
| CN | 101226451 A | 7/2008 |
| CN | 101853113 A | 10/2010 |
| CN | 201654751 U | 11/2010 |
| CN | 102207785 | 10/2011 |
| TW | 419984 | 1/2012 |
| TW | 201205384 | 2/2012 |

* cited by examiner

*Primary Examiner* — Gene W Lee
(74) *Attorney, Agent, or Firm* — Cooper Legal Group, LLC

(57) ABSTRACT

A touch panel is provided, which includes a sensing electrode layer formed on a strengthened upper-cover substrate. The sensing electrode layer includes a plurality of sensing electrodes, wherein at least one end of each of sensing electrode has a comb-shaped terminal extending outwards. The comb-shaped terminal includes at least one branch. A masking layer is formed on the sensing electrode layer and at least a part of the masking layer overlaps the comb-shaped terminal. Furthermore, a touch display using the touch panel is also provided.

16 Claims, 6 Drawing Sheets

TOUCH PANEL COMPRISING A SENSING ELECTRODE LAYER AND TOUCH SENSING DISPLAY USING THE SAME

BACKGROUND OF THE INVENTION

This Application claims the benefit of the People's Republic of China Application No. 201210151070.8, filed on May 16, 2012.

FIELD OF THE INVENTION

The disclosure relates to a touch technology, and more particularly to a touch panel and a touch display using the same.

DESCRIPTION OF THE RELATED ART

In recent years, touch panels have been used considerably in various electronic products such as mobile phone, personal digital assistant or palm personal computer etc. FIG. 1 shows a partially planar schematic diagram of a known touch panel, wherein the touch panel comprises a sensing electrode layer 10 and a masking layer 20, wherein the sensing electrode layer 10 is formed on a substrate and comprises a plurality of sensing electrodes 10X and 10Y, and the masking layer 20 is further formed on the sensing electrode layer 10 and covers the outermost part of sensing electrodes 10X and 10Y, thereby the area formed by the masking layer 20 is an invisible area of the touch panel, while the area enclosed by the masking layer 20 is a visible area of the touch panel.

However, since the sensing electrode layer 10 is not entirely aligned to the edge of the substrate in the foregoing touch panel structure, and various sensing electrodes 10X and 10Y are independent and insulated from each other, the masking layer 20 covers the area having sensing electrodes 10X and 10Y and the area having no sensing electrode simultaneously, therefore, when viewed from the opposite side to the side where sensing electrode layer 10 is formed on the substrate, the invisible area formed on the masking layer 20 generates chromatic aberration and thus influences the appearance of touch device.

SUMMARY OF THE INVENTION

According to an embodiment of the disclosure, the design of leading-out ends of sensing electrodes formed on the touch panel is improved to reduce the area of sensing electrodes on invisible area formed by the masking layer and further to efficiently avoid chromatic aberration of the invisible area of touch panel due to sensing electrodes.

According to an embodiment of the disclosure, a touch panel comprises: a sensing electrode layer is formed on a strengthened upper-cover substrate and comprises a plurality of sensing electrodes, wherein at least one end of each of sensing electrodes has a comb-shaped terminal extending outwards, and the comb-shaped terminal includes at least one branch; a masking layer is formed on the sensing electrode layer and at least a part of the masking layer overlaps the comb-shaped terminal.

According to another embodiment of the disclosure, a touch display comprises a display assembly and a touch panel, wherein the touch panel comprises: a strengthened upper-cover substrate is disposed on the display assembly; a sensing electrode layer is disposed on one surface of the strengthened upper-cover substrate and comprises a plurality of sensing electrodes, wherein at least one end of each of sensing electrodes has a comb-shaped terminal extending outwards, and the comb-shaped terminal includes at least one branch, a masking layer is disposed on the sensing electrode layer and at least a part of the masking layer overlaps the comb-shaped terminal.

Hereby, in the condition of the touch panel wherein, the sensing electrode layer and the masking layer are formed on the same substrate and in the level structure, the sensing electrode layer is formed first and the masking layer is formed subsequently, the disclosure needn't to change manufacturing process or increase materials, that is, it can solve the chromatic aberration generated on the invisible area and thus efficiently reduce production cost.

To make the above-mentioned purposes, features and advantages of this disclosure more explicit, the following contents are coordinated with the attached schemas for detailed illustration as follows:

BRIEF DESCRIPTION OF THE DRAWINGS

For those skilled in the art, numerous embodiments and drawings described below are for illustration purpose only, and not to limit the scope of the present disclosure in any manner.

DETAILED DESCRIPTION OF THE EMBODIMENTS

The structure of a touch panel in accordance with the embodiment of the disclosure is that a sensing electrode layer and a masking layer are set on a strengthened upper-cover substrate and that the sensing electrode layer first and the masking layer subsequently are formed on the strengthened upper-cover substrate to form a level structure.

Figure 1:
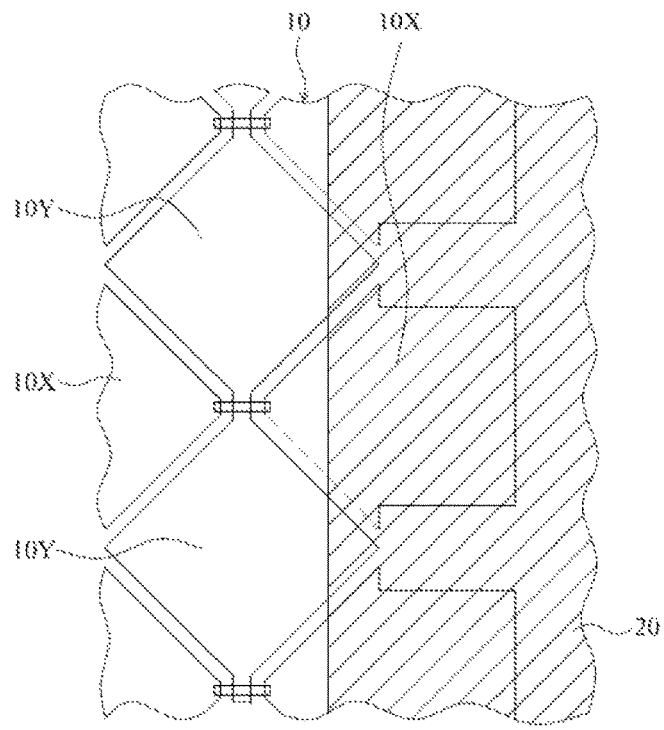
FIG. 1 is a partially planar schematic diagram of a known touch panel.
Figure 2:
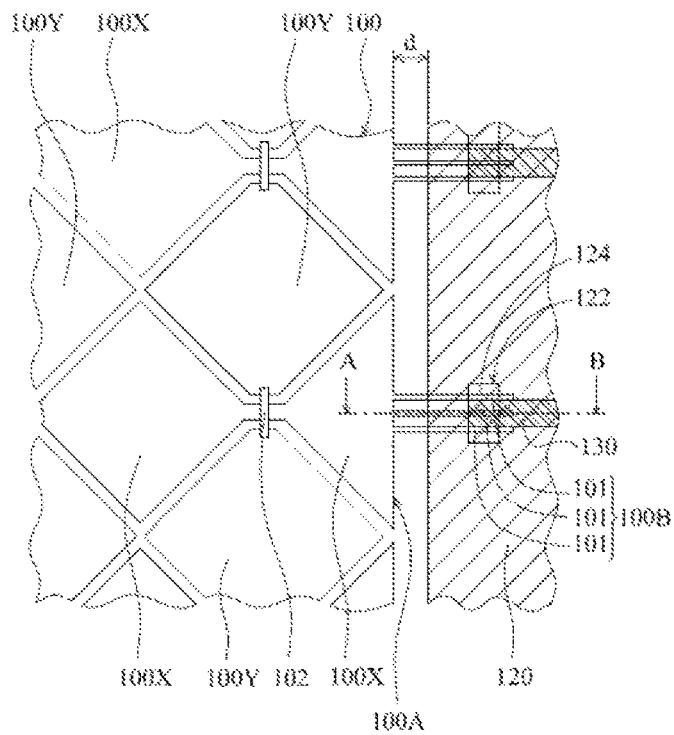
FIG. 2 is a partially planar schematic diagram of a touch panel in accordance with one embodiment of the disclosure.

FIG. 2 is a partially planar schematic diagram of a touch panel in accordance with one embodiment of the disclosure. The touch panel comprises a sensing electrode layer 100 formed on the strengthened upper-cover substrate (not shown), and the sensing electrode layer 100 comprises a plurality of sensing electrodes, wherein each row sensing electrode is connected in a series by a plurality of main bodies (diamond part) 100X and a plurality of connecting parts, while each column sensing electrode is connected in a series by a plurality of main bodies (diamond part) 100Y and a plurality of crossing lines 102. In present embodiment, the row sensing electrodes and the column sensing electrodes are intersect at 90 degree in the connecting parts and crossing lines 102. The material of crossing lines 102 can be metallic material and insulating parts (not shown) are set between the connecting parts of row sensing electrodes and the crossing lines 102 of column sensing electrodes, thereby insulating each row sensing electrode each column sensing electrode. The material of sensing electrode layer 100 is transparent conductive material such as ITO (Indium tin oxide), and the patterns of sensing electrode layer 100 can be formed by deposit manufacturing process and photo lithographic and etching manufacturing process. In other embodiments, the main bodies 100X and 100Y of sensing electrodes can be of other shapes such as rectangular.

In the embodiment, at least one end of each row sensing electrode and each column sensing electrode have a comb-shaped terminal 100B extending outwards, and the material of the comb-shaped terminals 100B can be the same as the sensing electrode layer 100, such as ITO.

In the embodiment, the shape of the outermost main bodies 100A of sensing electrodes of each column and each row is triangular. The comb-shaped terminals 100B can include at least one branch 101, in other words, the number of comb tooth of the comb-shaped terminals 100B is not limited. The comb-shaped terminals 100B of the embodiment are illustrated by three branches 101 which are set perpendicularly to one lateral of the outermost main bodies 100A. In other embodiments, the shape of the outermost main bodies 100A of sensing electrodes can be of other shapes as well, the branches 101 of the comb-shaped terminals 100B can also be of other shapes as well. In addition, the branches 101 of the comb-shaped terminals 100B can be set on an outermost lateral of the main bodies 100A by adopting a non-vertical angle.

The masking layer 120 is formed on the sensing electrode layer 100 and at least a part of the masking layer 120 overlaps the comb-shaped terminal 100B. The masking layer 120 further includes through holes 122, and the positions of the through holes 122 are corresponded to the comb-shaped terminals 100B. The material of the masking layer 120 can be black photo-resistor or black printing ink. The conductive adhesive 124 fills the through holes 122 to contact electrically the comb-shaped terminals 100B. It should be noted that the masking layer 120 and the extension point of comb-shaped terminal 100B extended from the sensing electrode (the outboard of the outermost main body 100A) are separated by a distance d, in other words, the masking layer 120 and the outboard of the outermost main body 100A are separated without contact.

According to the embodiment of the disclosure, the overlapped areas between the sensing electrode layer 100 and the masking layer 120 are only located on the comb-shaped terminals 100B. Due to the comb-shaped terminals 100B are designed as branch structure, the whole dimensional area of each comb-shaped terminal 100B is relatively less than the dimensional area of the main body 100A of each sensing electrode of sensing electrode layer 100. Therefore, the present embodiment can reduce the area of the sensing electrode layer 100 on the invisible area formed by the masking layer 120 and further efficiently avoids color difference generated on the invisible area of touch panel due to the sensing electrode layer 100. In the design, the width of each branch 101 of the comb-shaped terminal 100B can be 10 um, however, the actual width is not limited herein. As long as the transmission of electrical signals can be conducted and color difference generated on the invisible area can be avoided, namely the designs which the existence of the comb-shaped terminal 100B cannot be viewed within the area of the masking layer 120 are in the scope of the disclosure. Therefore, the touch panel of the embodiment of the disclosure avoids the visibility of the sensing electrode patterns of the known touch panel within the area of the masking layer.

The conductive wire layer 130 is disposed above the masking layer 120 and is electrically contacted with the conductive adhesive 124. The comb-shaped terminals 100B are connected electrically with the conductive wire layer 130 via the conductive adhesive 124. The conductive wire layer 130 acts as signal transmission line and transmits electrical signals generated by the sensing electrode layer 100 to the external detection circuit (not shown), thereby the external detection circuit can determine the touch positions according to the electrical signals. Since the masking layer 120 and the outermost main body 100A of sensing electrode are separated by the distance d, and even if photo lithographic and etching process for forming the conductive wire layer 130 generates conductive residues, such as metal or ITO residue, at the edge of the masking layer 120, these conductive residues will not cause short circuit between different sensing electrodes. Of course, where the residues at the edge of the masking layer 120 are not necessary to be considered as in other embodiments of the disclosure, the distance d designed in the particular embodiment can be zero, which makes the masking layer 120 align to the outermost main body 100A of sensing electrode.

Figure 3:
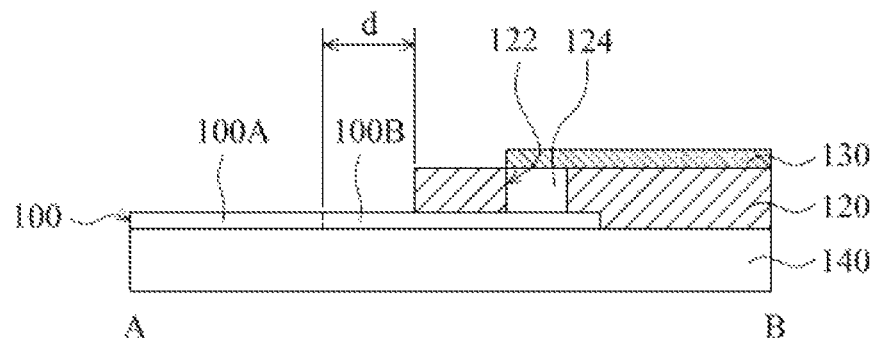
FIG. 3 is a partially cross-sectional schematic diagram of the touch panel cut along the cross-sectional line A-B of FIG. 2 in accordance with one embodiment of the disclosure.

FIG. 3 is a partially cross-sectional schematic diagram of the touch panel cut along the cross-sectional line A-B of FIG. 2 in accordance with an embodiment of the disclosure. The touch panel of the present embodiment is drawn in the configuration which the strengthened upper-cover substrate 140 is at the bottom. All the touch elements of the touch panel of the embodiment are disposed on the strengthened upper-cover substrate 140. The strengthened upper-cover substrate 140 is a protective outer cover for protecting all the touch elements except carrying the sensing electrode layer 100. The partial sensing electrode layer 100 shown in FIG. 3 comprises the outermost main body 100A of sensing electrode and the comb-shaped terminal 100B. The masking layer 120 and the outermost main body 100A are separated by a distance d. The masking layer 120 covers part of the comb-shaped terminals 100B and has the through hole 122 for corresponding to the comb-shaped terminal 100B and exposing a part of the comb-shaped terminals 100B. The conductive adhesive 124 fills the through hole 122 to electrically connect with the comb-shaped terminals 100B, which makes the conductive wire layer 130 connect electrically with the comb-shaped terminal 100B via the conductive adhesive 124.

Figure 4:
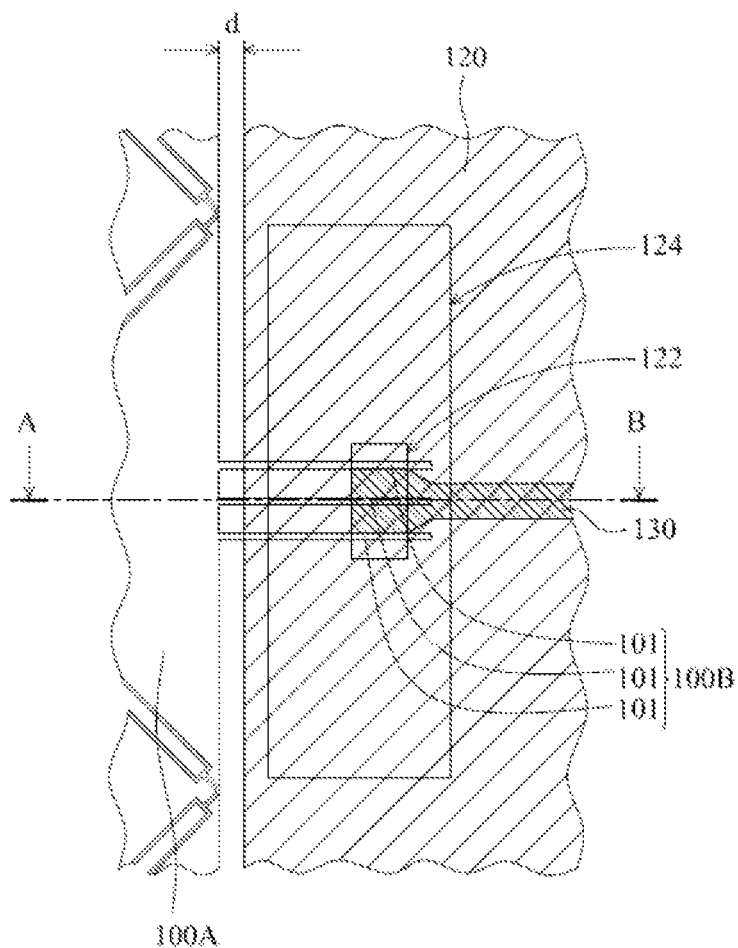
FIG. 4 is a partially planar schematic diagram of a touch panel in accordance with another embodiment of the disclosure.

FIG. 4 is a partially planar schematic diagram of touch panel in accordance with another embodiment of the disclosure. The difference between FIG. 4 and FIG. 2 is that the coating area of the conductive adhesive 124 is enlarged. The coating area of the conductive adhesive 124 in FIG. 4 is larger than the cross-sectional area of the through hole 122, which is about 20-200% of the area of the outermost main body 100A of sensing electrode. The increase in the coating area of conductive adhesive 124 can compensate the lack of inductive area of the comb-shaped terminal 100B, which conduces to the sensing flexibility of sensing electrode layer. In the embodiment, the coating shape of the conductive adhesive 124 is rectangular. In other embodiments, the coating shapes of conductive adhesive 124 can be of other shapes, such as diamond shaped.

Figure 5:
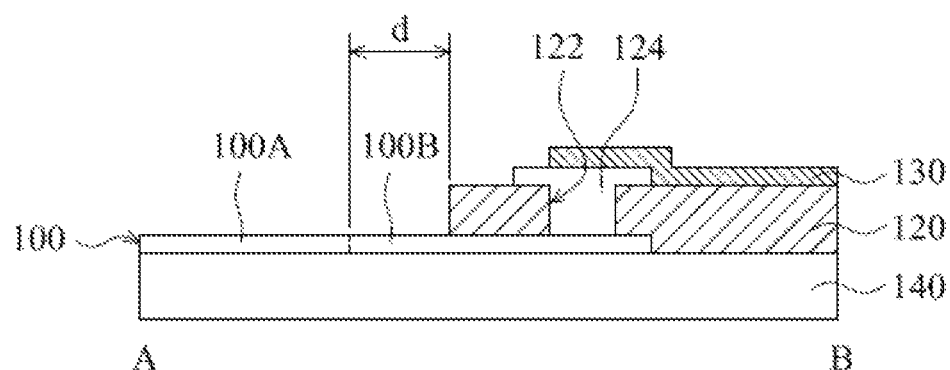
FIG. 5 is a partially cross-sectional schematic diagram of the touch panel cut along the cross-sectional line A-B of FIG. 4 in accordance with one embodiment of the disclosure.

FIG. 5 is a partial cross-sectional schematic diagram of the touch panel cut along the cross-sectional line A-B in FIG. 4 in accordance with an embodiment of the disclosure. The touch panel of the present embodiment is drawn in the configuration which the strengthened upper-cover substrate 140 is at the bottom. In the embodiment, the sensing electrode layer 100 is formed on the strengthened upper-cover substrate 140 which is a protective outer cover. The partial sensing electrode layer 100 includes the outermost main body 100A of sensing electrode and the comb-shaped terminal 100B. The masking layer 120 is separated from the outermost main body 100A of sensing electrode with a distance d and covers a part of the comb-shaped terminals 100B and has the through hole 122 corresponding to the comb-shaped terminal 100B to expose a part of the comb-shaped terminals 100B. The conductive adhesive 124 fills the through hole 122 from up to down and is further coated above the masking layer 120 to electrically contact with the comb-shaped terminal 100B. The conductive wire layer 130 is electrically connected to the comb-shaped terminal 100B via the conductive adhesive 124.

Figure 6:
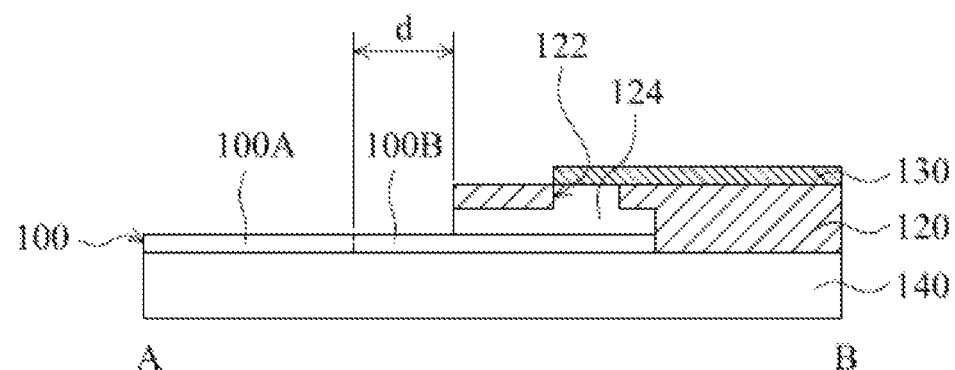
FIG. 6 is a partially cross-sectional schematic diagram of the touch panel cut along the cross-sectional line A-B of FIG. 4 in accordance with another embodiment of the disclosure.

FIG. 6 is a partially cross-sectional schematic diagram of the touch panel cut along the cross-sectional line A-B in FIG. 4 in accordance with another embodiment of the disclosure. The structure of the embodiment is roughly consistent with the structure of FIG. 5, with the difference being that the conductive adhesive 124 covers a part of comb-shaped terminals 100B firstly to connect with the comb-shaped terminals 100B and then forms a masking layer 120 to make the conductive adhesive 124 coated below the masking layer 120, and the conductive adhesive 124 further fills the through holes 122 from up to down which correspond to the comb-shaped terminals 100B. The conductive wire layer 130 is electrically connected with the comb-shaped terminal 100B via the conductive adhesive 124.

Figure 7:
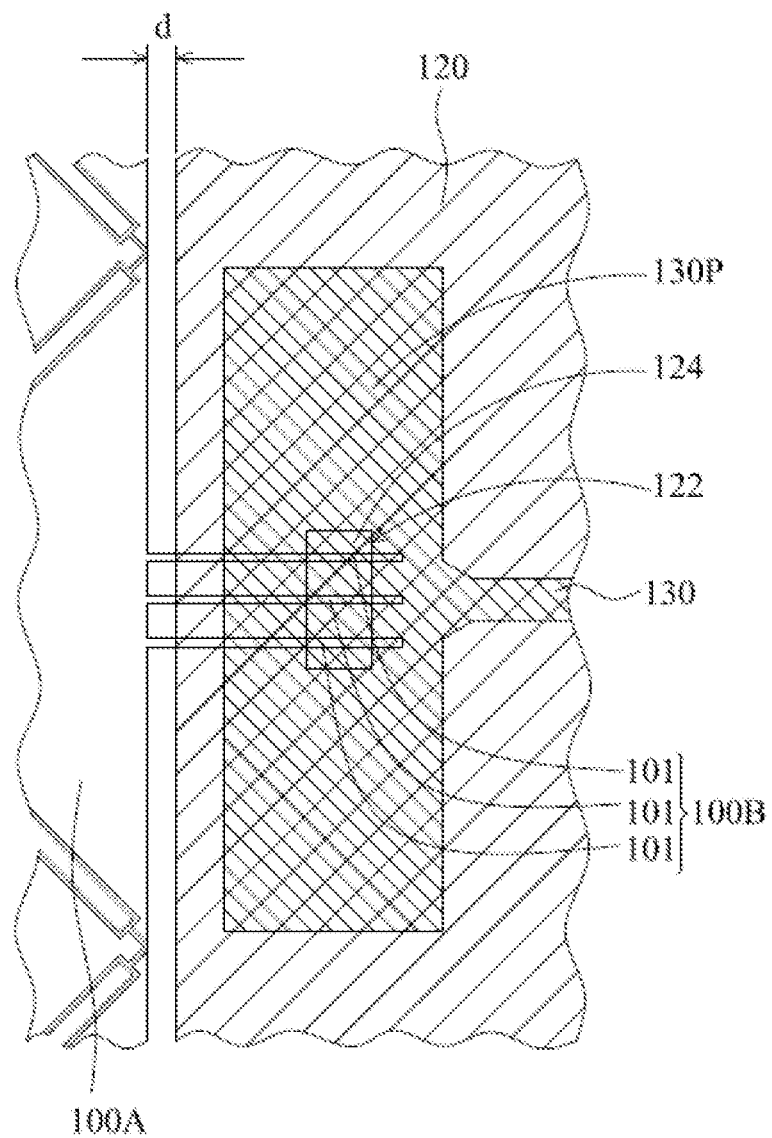
FIG. 7 is a partially planar schematic diagram of a touch panel in accordance with another embodiment of the disclosure.

FIG. 7 is a partially planar schematic diagram of a touch panel in accordance with another embodiment of the disclosure. The difference between FIG. 7 and FIG. 2 is that the conductive wire layer 130 further includes conductive pads 130P covering the comb-shaped terminals 100B, the conductive adhesive 124 and the masking layer 120, and the conductive wire layer 130 is electrically contacted with the conductive adhesive 124 through conductive pads 130P, and the conductive adhesive 124 only fills the through holes 122. The area of conductive pads 130P is larger than the cross-sectional area of the through hole 122, which is about 20-200% of the area of the outermost main bodies 100A of sensing electrodes. The conductive pads 130P can compensate lack of the inductive area of the comb-shaped terminal 100B, which conduces to the sensing flexibility of sensing electrode layer.

Figure 8:
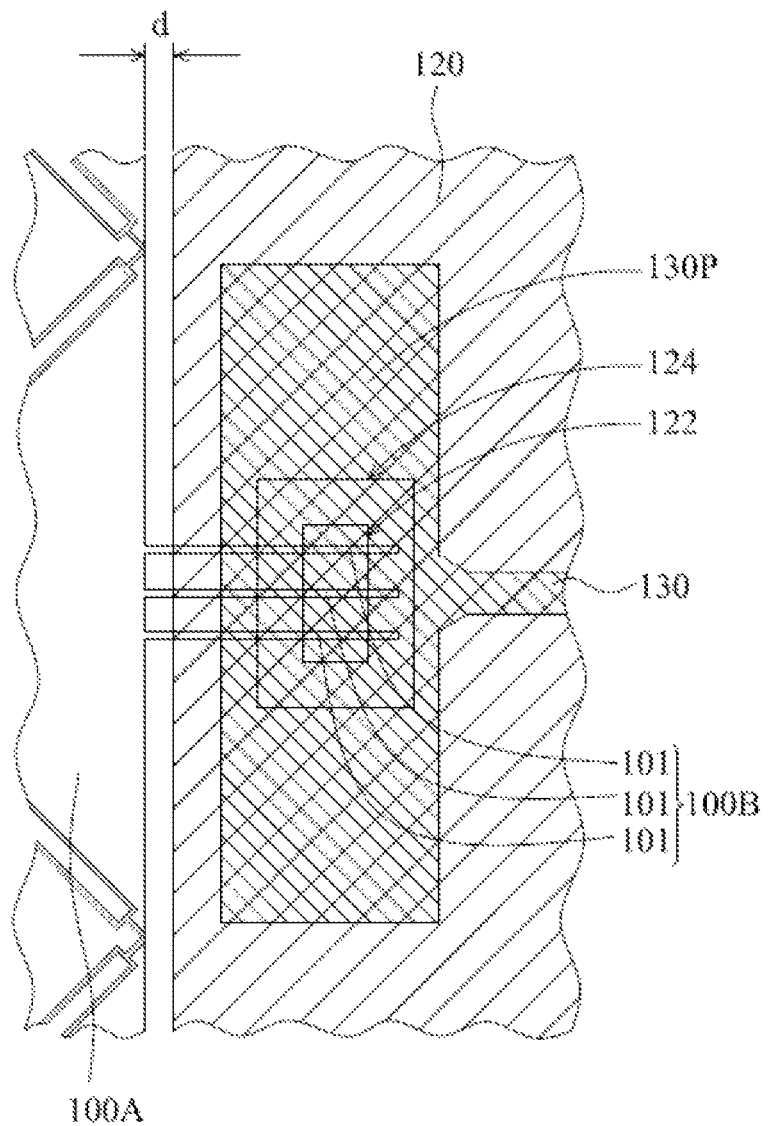
FIG. 8 is a partially planar schematic diagram of a touch panel in accordance with another embodiment of the disclosure.

FIG. 8 is a partially planar schematic diagram of a touch panel in accordance with another embodiment of the disclosure. The difference between FIG. 8 and FIG. 7 is that the coating area of the conductive adhesive 124 is larger than the cross-sectional area of the through hole 122 but is smaller than the area of conductive pads 130P. In the embodiment, the conductive adhesive 124 can be disposed over or below the masking layer 120 and fills the through holes 122.

In various embodiments of the disclosure, the color of conductive adhesive 124 is identical to that of masking layer 120, which makes the colors of invisible areas of touch panel uniform. Of course, different colors can be adopted in the design according to the specification requirement of an actual touch panel, but the same is not limited in the embodiment.

Compared with a known touch panel, the change of manufacturing process or the increase of materials is not necessary for making touch panels of various embodiments, such as use of inorganic refractive index matching material layer for eliminating etching lines or other material layers. The improvement in the design of leading-out terminals of sensing electrodes reduces the area of the sensing electrodes on the invisible area formed by the masking layer, that is, the design can efficiently avoid color difference of the invisible area of touch panel due to sensing electrodes Furthermore, the various embodiments of the embodiment can efficiently reduce production cost of touch panels.

In addition, the masking layer 120 and the outermost main body 100A of the sensing electrode are set by separating from each other at a distance, therefore, even if conductive residues are generated at the edge of the masking layer 120, they will not cause short circuit between the sensing electrodes.

Figure 9:
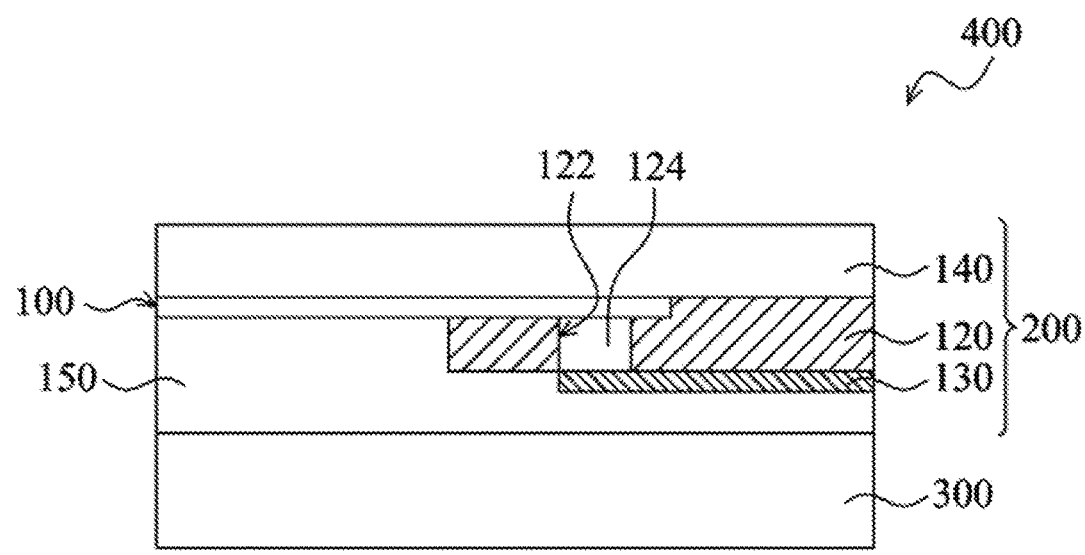
FIG. 9 is a partially cross-sectional schematic diagram of a touch display in accordance with another embodiment of the disclosure.

FIG. 9 is a partially cross-sectional schematic diagram of a touch display in accordance with an embodiment of the disclosure. The touch display 400 includes a display assembly 300 and a touch panel 200. The touch panel 200 is set on the display assembly 300, wherein the display assembly 300 can be a liquid crystal display or any other kind of displays. In the embodiment, the touch panel shown by the embodiment of FIG. 2 is taken as an illustration for the touch panel 200 that includes the strengthened upper-cover substrate 140, the sensing electrode layer 100, the masking layer 120, the conductive adhesive 124, and the conductive wire layer 130.

The strengthened upper-cover substrate 140 set above the display assembly 300, and the sensing electrode layer 100 disposed on one surface of the strengthened upper-cover substrate 140, the surface is, for example, closed to the side of the display assembly 300. The sensing electrode layer 100 includes a plurality of sensing electrodes, wherein at least one end of each of sensing electrodes has a comb-shaped terminal extending outwards.

The masking layer 120 is disposed on the sensing electrode layer 100 and at least a part of the masking layer 120 overlaps the comb-shaped terminals. The masking layer 120 has the through holes 122 corresponding to the comb-shaped terminals. The conductive adhesive 124 fills the through holes 122 to electrically contact with the comb-shaped terminals.

The conductive wire layer 130 is disposed above the masking layer 120 and is electrically connected with the conductive adhesive 124. The comb-shaped terminals are electrically connected with the conductive wire layer 130 via the conductive adhesive 124. In addition, a protective layer 150 and/or other shielding layers (not shown) are also formed above the strengthened upper-cover substrate 140 to cover the foregoing touch elements comprehensively. As a result, the protective layer 150 and/or the shielding layer are adjacently joined to the display assembly 300.

In the embodiments of other touch displays, their adopted touch panels 200 can further use the designs of different structures of touch panels disclosed in the foregoing embodiment.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch panel, comprising:
   a sensing electrode layer, formed on a strengthened upper-cover substrate and comprising a plurality of sensing electrodes, wherein at least one end of each of sensing electrodes has a comb-shaped terminal extending outwards, and the comb-shaped terminal has at least one branch;
   a masking layer, formed on the sensing electrode layer, and at least a part of the masking layer overlapping the comb-shaped terminals; and
   a conductive adhesive filling a through hole of the masking layer, wherein the through hole corresponds to the comb-shaped terminal, and the conductive adhesive is further coated above or below the masking layer.

2. The touch panel of claim 1, wherein the coating area of the conductive adhesive is larger than the cross-sectional area of the through hole.

3. The touch panel of claim 1, wherein the coating area of the conductive adhesive is 20-200% of the area of a main body of the sensing electrodes.

4. The touch panel of claim 1, wherein the coating shape of the conductive adhesive includes diamond or rectangular shape.

5. The touch panel of claim 1, further comprising a conductive wire layer disposed above the masking layer and electrically contacted with the conductive adhesive.

6. The touch panel of claim 5, wherein the conductive wire layer further comprises a conductive pad, and the conductive wire layer is electrically contacted with the conductive adhesive through the conductive pad.

7. The touch panel of claim 6, wherein the area of the conductive pad is larger than the cross-sectional area of the through hole.

8. The touch panel of claim 6, wherein the area of the conductive pad is 20-200% of the area of a main body of the sensing electrodes.

9. The touch panel of claim 1, wherein the conductive adhesive has the same color as the masking layer.

10. The touch panel of claim 1, wherein the masking layer and an extension point of the comb-shaped terminal extended from the sensing electrode are separated by a distance.

11. A touch display, comprising:
    a display assembly; and
    a touch panel, wherein the touch panel comprises:
       a strengthened upper-cover substrate, set above the display assembly;
       a sensing electrode layer, disposed on one surface of the strengthened upper-cover substrate, and comprising a plurality of sensing electrodes, wherein at least one end of each of the sensing electrodes has a comb-shaped terminal extending outwards, and the comb-shaped terminal includes at least one branch;
       a masking layer, disposed on the sensing electrode layer and at least a part of the masking layer overlapping the comb-shaped terminal; and
       a conductive adhesive filling a through hole of the masking layer, wherein the through hole corresponds to the comb-shaped terminal, and the conductive adhesive is further coated above or below the masking layer.

12. The touch display of claim 11, wherein the coating area of the conductive adhesive is larger than the cross-sectional area of the through hole.

13. The touch display of claim 11, further comprising a conductive wire layer disposed above the masking layer and electrically contacted with the conductive adhesive.

14. The touch display of claim 13, wherein the conductive wire layer further includes a conductive pad, and the conductive wire layer is electrically contacted with the conductive adhesive through the conductive pad.

15. The touch display of claim 14, wherein the area of the conductive pad is larger than the cross-sectional area of the through hole.

16. The touch display of claim 11, wherein the masking layer and an extension point of the comb-shaped terminal extended from the sensing electrode are separated by a distance.

* * * * *